US008808566B2

(12) United States Patent
Takahashi et al.

(10) Patent No.: US 8,808,566 B2

(45) Date of Patent: Aug. 19, 2014

(54) COMPOSITE MAGNETIC MATERIAL

(75) Inventors: Takeshi Takahashi, Kyoto (JP); Yuya Wakabayashi, Hyogo (JP)

(73) Assignee: Panasonic Corporation, Osaka (JP)

( * ) Notice: Subject to any disclaimer, the term of this patent is extended or adjusted under 35 U.S.C. 154(b) by 550 days.

(21) Appl. No.: 13/203,271

(22) PCT Filed: Mar. 24, 2010

(86) PCT No.: PCT/JP2010/002046

§ 371 (c)(1), (2), (4) Date: Aug. 25, 2011

(87) PCT Pub. No.: WO2010/109850

PCT Pub. Date: Sep. 30, 2010

(65) Prior Publication Data

US 2012/0007013 A1 Jan. 12, 2012

(30) Foreign Application Priority Data

Mar. 25, 2009 (JP) ................................ 2009-073301

(51) Int. Cl.

| | |
|---|---|
| ***B22F 3/00*** | (2006.01) |
| ***C04B 35/64*** | (2006.01) |
| ***C22C 38/06*** | (2006.01) |
| ***H01F 41/02*** | (2006.01) |
| ***C22C 38/08*** | (2006.01) |
| ***C22C 33/02*** | (2006.01) |
| ***H01F 1/28*** | (2006.01) |
| ***H01F 1/26*** | (2006.01) |
| ***C22C 38/02*** | (2006.01) |

(52) U.S. Cl.

CPC ......... *H01F 41/0246* (2013.01); *B22F 2998/00* (2013.01); *C22C 38/06* (2013.01); *C22C 2202/02* (2013.01); *C22C 38/08* (2013.01); *C22C 33/0278* (2013.01); *H01F 1/28* (2013.01); *B22F 2304/10* (2013.01); *H01F 1/26* (2013.01); *C22C 38/02* (2013.01)

USPC .................................... 252/62.55; 252/62.56

(58) Field of Classification Search

CPC .......... B22F 2999/00; B22F 3/02; B22F 3/10; B22F 2998/10; B22F 2304/10; B22F 3/24; B22F 9/04; C22C 33/0278; C22C 2202/02; C22C 38/02; C22C 38/06; C22C 38/08; H01F 1/28; H01F 41/0246; H01F 1/0577; C23C 22/18; C23C 22/42; C23C 22/73; C23C 22/74

USPC ........... 252/62.55, 62.56, 62.64; 427/255.19; 428/457; 524/435, 556, 588

See application file for complete search history.

(56) References Cited

U.S. PATENT DOCUMENTS

| | | | | |
|---|---|---|---|---|
| 5,407,725 A * | 4/1995 | Ryoke et al. | .................. | 428/141 |
| 5,780,530 A * | 7/1998 | Mizutani et al. | .............. | 523/209 |
| 6,043,327 A | 3/2000 | Attarwala et al. | | |
| 6,063,209 A * | 5/2000 | Matsutani et al. | ............ | 148/300 |
| 6,558,565 B1 | 5/2003 | Matsutani et al. | | |
| 6,787,191 B2 | 9/2004 | Hanahata et al. | | |
| 2003/0099844 A1 | 5/2003 | Hanahata et al. | | |
| 2006/0252863 A1 | 11/2006 | Takeko et al. | | |
| 2008/0050581 A1* | 2/2008 | Miwa et al. | .................. | 428/332 |

FOREIGN PATENT DOCUMENTS

| | | |
|---|---|---|
| CN | 1198577 A | 11/1998 |
| CN | 1265118 A | 8/2000 |
| CN | 1294746 A | 5/2001 |
| CN | 1422310 A | 6/2003 |
| CN | 1880400 A | 12/2006 |
| CN | 1938795 A | 3/2007 |
| JP | 06-029114 A | 2/1994 |
| JP | 11-238613 A | 8/1999 |
| JP | 2004-253434 | 9/2004 |
| JP | 2004-253434 A | 9/2004 |
| JP | 2005-187929 A | 7/2005 |
| JP | 2006-286743 A | 10/2006 |
| JP | 2009-041101 | 2/2009 |
| JP | 2009-041101 A | 2/2009 |
| WO | PCT/JP2010/002046 | 6/2010 |

OTHER PUBLICATIONS

CN CIP (2003) 022878 with English translation; Silicone resins . . . high temperature resistant coatings . . . ; pp. 123-124.

CN CIP (2005) 094443 with English translation; . . . silicone dioxide . . . ; pp. 525-253.

* cited by examiner

*Primary Examiner* — Carol M Koslow

*Assistant Examiner* — Lynne Edmondson

(74) *Attorney, Agent, or Firm* — RatnerPrestia

(57) ABSTRACT

A composite magnetic material is made by performing pressure compacting on metal magnetic powder to which a binding material is added, and the binding material contains an acrylic resin having a silyl group as a functional group. In addition, the composite magnetic material is subjected to a heat treatment at a temperature between 700 and 1,000° C. in a non-oxidizing atmosphere after the pressure compacting. The composite magnetic material has magnetic characteristics useful for electromagnetic components such as an inductor, a choke coil, and a transformer with a small size and at a high frequency.

8 Claims, No Drawings

COMPOSITE MAGNETIC MATERIAL

THIS APPLICATION IS A U.S. NATIONAL PHASE APPLICATION OF PCT INTERNATIONAL APPLICATION PCT/JP2010/002046.

TECHNICAL FIELD

The present invention relates to a composite magnetic material used for an inductor, a choke coil, a transformer, and the like of electronic apparatuses.

BACKGROUND ART

With a reduction in the sizes of electric and electronic apparatuses in recent years, a reduction in the size and an increase in the efficiency of a magnetic material are required. As a magnetic material according to the related art, for example, in a choke coil used for a high frequency circuit, there are a ferrite core using ferrite powder and a dust core which is a compact of metal magnetic powder.

Among them, the ferrite core has disadvantages in that the saturation magnetic flux density is low and DC bias characteristics are low. Therefore, in the ferrite core according to the related art, in order to ensure the DC bias characteristics, a gap of several hundreds of micrometers is provided in a direction perpendicular to the flux path, thereby preventing a reduction in an inductance value L during DC bias. However, this wide gap becomes a source of generating buzzing noise, and leakage magnetic flux generated from the gap causes a significant increase in copper loss of a winding wire particularly in a high frequency band.

Contrary to this, the dust core produced by compacting metal magnetic powder has a much higher saturation magnetic flux density than that of the ferrite core, and therefore it can be said that the dust core is advantageous for size reduction. In addition, unlike the ferrite core, the dust core can be used without a gap, and thus has low buzzing noise and low copper loss due to leakage magnetic flux.

However, it cannot be said that the dust core is better than the ferrite core in terms of magnetic permeability and core loss. In particular, in the dust core used in a choke coil or an inductor, the temperature of the core increases with an increase in the core loss, so that it is difficult to achieve a reduction in the size. In addition, in order to enhance magnetic characteristics of the dust core, the compacting density thereof needs to be increased, and during production, a compacting pressure of equal to or higher than 5 ton/cm$^2$ is generally needed and a compacting pressure of equal to or higher than 10 ton/cm$^2$ is needed depending on products.

Here, the core loss of the dust core is generally caused by hysteresis loss and eddy-current loss. In a metal material, due to a low specific resistivity, with regard to a change in magnetic field, eddy current flows so as to suppress the change, so that the eddy-current loss becomes a problem. The eddy-current loss increases in proportion to the square of the frequency and the square of the area through which the eddy current flows. Therefore, by coating the surface of the metal magnetic power with an insulating material, the area through which the eddy current flows is suppressed only to the inside of the metal magnetic powder particles from the entire core across the metal magnetic powder particles, so that the eddy-current loss can be reduced.

On the other hand, since the dust core is compacted at a high pressure, a large amount of processing strain is introduced to the magnetic material, so that magnetic permeability is reduced, and so that hysteresis loss is increased.

In order to avoid this, after compacting, a heat treatment for relieving the strain is performed as needed. In general, in a metal material, recovery is a phenomenon that occurs at a temperature of equal to or higher than half the melting point, and in order to sufficiently relieve the strain in an alloy with an Fe-rich composition, a heat treatment needs to be performed at least 600° C. or higher, and preferably, at 700° C. or higher.

That is, in the dust core, it is important to realize a high-temperature heat treatment in a state where insulating properties are ensured in the metal magnetic powder.

However, most of the organic resins, such as an epoxy resin, phenolic resin, or vinyl chloride resin, used as an insulating binder of the dust core according to the related art have low heat resistance and undergo thermal decomposition when a high-temperature heat treatment is performed thereon in order to relieve the strain, and thus cannot be used.

As a solution of this problem, for example, like Patent Document 1, a technique of using a polysiloxane resin is proposed.

However, even in this technique, the heat resistant temperature is about 500 to 600° C., and a heat treatment at a higher temperature is difficult.

In order to solve the problems, the present invention provides a composite magnetic material which enables a high-temperature heat treatment, thereby realizing excellent magnetic characteristics.

CITATION LIST

Patent Literature

[PTL 1] Japanese Patent Unexamined Publication No. H06-29114

DISCLOSURE OF THE INVENTION

A composite magnetic material of the invention is a composite magnetic material made by performing pressure compacting on metal magnetic power to which a binding material is added, and the binding material contains an acrylic resin at least having a silyl group as a functional group.

According to this configuration, a composite magnetic material with excellent magnetic characteristics, which has high heat resistance and to which a high-temperature heat treatment can be performed, can be realized.

PREFERRED EMBODIMENTS FOR CARRYING OUT THE INVENTION (Embodiment 1)

Hereinafter, a composite magnetic material in Embodiment 1 of the invention will be described.

Metal magnetic powder used in this embodiment contains at least Fe having high saturation magnetization, and preferably, is at least one selected from Fe, Fe—Si-based, Fe—Ni-based, and Fe—Si—Al-based powder.

The Fe—Si-based powder used in this embodiment includes Si of which the content is equal to or higher than 1 wt % and equal to or lower than 8 wt %, and the balance composed of Fe and inevitable impurities. The roles of Si according to the invention are to enhance magnetic characteristics, reduce magnetic anisotropy and a magnetostriction constant, increase electrical resistance, and reduce eddy-current loss. In addition, it is preferable that the amount of Si added be equal to or higher than 1 wt % and equal to or lower than 8 wt %. If the amount is lower than 1 wt %, an effect of improving magnetic characteristics is insufficient, and if the amount is higher than 8 wt %, the reduction in the saturation magnetization is significant and DC bias characteristics are degraded.

The Fe—Ni-based powder used in this embodiment includes Ni of which the content is equal to or higher than 40 wt % and equal to or lower than 90 wt %, and the balance composed of Fe and inevitable impurities. The role of Ni according to the invention is to enhance magnetic characteristics, and it is preferable that the addition amount be equal to or higher than 40 wt % and equal to or lower than 90 wt %. If the amount is lower than 40 wt %, the effect of improving magnetic characteristics is insufficient, and if the amount is higher than 90 wt %, the reduction in the saturation magnetization is significant and DC bias characteristics are degraded. Furthermore, in order to improve magnetic permeability, it is possible to add 1 to 6 wt % of Mo.

The Fe—Si—Al-based powder used in this embodiment includes Si of which the content is equal to or higher than 8 wt % and equal to or lower than 12 wt %, Al of which the content is equal to or higher than 4 wt % and equal to or lower than 6 wt %, and the balance composed of Fe and inevitable impurities. The role of Si and Al according to the invention is to enhance magnetic characteristics, and it is preferable that Si and Al have the above-described composition ranges. If the amounts of Si and Al added are lower than the composition ranges, the effect of improving magnetic characteristics is insufficient, and if the amounts are higher than the composition ranges, the reduction in the saturation magnetization is significant and DC bias characteristics are degraded.

It is preferable that the average particle size of the metal magnetic powder used in this embodiment be equal to or greater than 1 μm and equal to or smaller than 100 μm. If the average particle size thereof is smaller than 1 μm, compacting density is reduced, and thus magnetic permeability is degraded, which is not preferable. If the average particle size thereof is greater than 100 μm, eddy-current loss is increased at a high frequency, which is not preferable. More preferably, the average particle size may be equal to or smaller than 50 μm.

A method of producing the metal magnetic powder used in this embodiment is not particularly limited, and various atomizing methods and various kinds of ground powder may be used.

The shape of the metal magnetic powder used in this embodiment is not particularly limited, and a substantially spherical shape, a flat shape, or the like may be selected depending on the purpose of use.

The binding material used in this embodiment contains at least an acrylic resin of which the main chain is an acrylic polymer and which has a silyl group expressed by (Chem. 1) as a functional group. In addition, R1, R2, and R3 in the formula are organic bodies.

[Chem. 1]

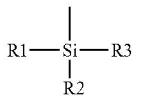

This acrylic resin has the silyl group as the functional group and contains Si that forms an oxide having insulating properties. Si is bonded to oxygen in the skeleton of the acrylic resin or in the atmosphere of a degreasing process or a heat treatment process during thermal decomposition of the acrylic resin in the degreasing process or the heat treatment process that will be described later, and thus forms an insulating oxide so as to be arranged among the metal magnetic powder. Therefore, the heat resistance of the composite magnetic material is enhanced, so that a high-temperature heat treatment can be performed.

In addition, the effect is not obtained through combined addition of silicon oxide powder which is a Si oxide and the acrylic resin. When silicon oxide is added, since the silicon oxide powder is hard and has a high breaking strength and thus is less likely to be deformed, it is difficult to increase the density during pressure compacting, and due to the low compacting density, the magnetic permeability is reduced.

According to this embodiment, the binding material is an organic body, and the increase in the density can be realized by performing pressure compacting. In addition, by changing Si contained in the organic body into an insulating oxide during the degreasing process, the heat treatment process, or the like after the pressure compacting, the heat resistance of the composite magnetic material is enhanced, and a high-temperature heat treatment can be performed thereon.

In addition, since the acrylic resin has the acrylic polymer as the main chain and has good thermal decomposition properties, the acrylic resin can be degreased at a low temperature between about 200 and 400° C., and an amount of remaining carbon can be significantly reduced.

Since carbon has strong reducing properties and activates the surface of the metal magnetic powder under a high temperature atmosphere, carbon accelerates sintering of the metal magnetic powder and thus causes an increase in eddy-current loss. In addition, in the high-temperature atmosphere, diffusion of carbon into the metal magnetic powder occurs, which causes the degradation of magnetic characteristics.

Since the acrylic resin significantly reduces the amount of remaining carbon as described above, the acrylic resin suppresses sintering of the metal magnetic powder even under a high-temperature atmosphere of 700° C. or higher and thus allows the high-temperature heat treatment to be performed. In addition, the acrylic resin suppresses the diffusion of carbon into the metal magnetic powder, realizing excellent magnetic characteristics.

It is preferable that the silyl group contained in the acrylic resin used in this embodiment have at least one alkoxy group. That is, it is preferable that at least one of R1, R2, and R3 in the formula of (Chem. 1) be an alkoxy group. A hydroxy group is generally present on the surface of an inorganic material, and the alkoxy group is chemically bonded to the surface of the metal magnetic powder by a condensation reaction with the hydroxy group present on the surface of the metal magnetic powder. Therefore, dispersability of the acrylic resin into the metal magnetic powder is enhanced, and coatability and uniformability of the surface of the metal magnetic powder by the silyl group are enhanced. That is, an increase in the density of the composite magnetic material is further achieved, and thus the insulating properties are further enhanced.

More preferably, in the silyl group, the number of carbon atoms of the alkoxy group is in the range of 1 to 4. By causing the number of carbon atoms to be 1 to 4, a property of reacting with the surface of the metal magnetic powder is enhanced, so that dispersability of the acrylic resin into the metal magnetic powder can further be enhanced. That is, the coatability and uniformity of the surface of the metal magnetic powder by the silyl group are further enhanced, so that the insulating properties that are caused by a further increase in the density are further enhanced.

The acrylic polymer which is the main chain of the acrylic resin used in this embodiment is not particularly limited, and polymers of various monomers such as acrylic acid, methacrylic acid, an acrylic acid ester-based monomer or a methacrylic acid ester-based monomer may be used.

For the purpose of enhancing the dispersability or compact strength, in addition to the acrylic resin, for example, various coupling agents such as silane-based, titanium-based, chromium based, and aluminum-based agents, silicone resin, epoxy resin, acrylic resin (with no silyl group), butyral resin, phenolic resin, and the like may be added as aids to the binding material used in this embodiment.

It is preferable that the addition amount of the binder used in this embodiment be in the range of 0.2 to 5.0 parts by weight with respect to 100 parts by weight of the metal magnetic powder. If the addition amount is smaller than 0.2 parts by weight, the heat resistance is degraded, which is not preferable. If the addition amount is greater than 5.0 parts by weight, the compact density is reduced and thus the magnetic characteristics are degraded, which is not preferable.

A method of mixing and dispersing the binding material in this embodiment is not particularly limited, and for example, various ball mills such as a rotary ball mill or a planetary ball mill, a V blender, a planetary mixer, and the like may be used.

A pressure compacting method used in this embodiment is not particularly limited, and a typical pressure compacting method is used. It is preferable that the compacting pressure be in the range of equal to or higher than 5 ton/$cm^2$ and equal to or lower than 20 ton/$cm^2$. If the compacting pressure is lower than 5 ton/$cm^2$, the filling rate of the metal magnetic powder is low, and high magnetic characteristics cannot be obtained. If the compacting pressure is higher than 20 ton/$cm^2$, a mold is increased in size in order to ensure a compacting strength during the pressure compacting, and a press machine is increased in size in order to ensure a compacting pressure. Furthermore, due to the increases in the sizes of the mold and the press machine, productivity is reduced, resulting in an increase in costs.

In this embodiment, a heat treatment after the pressure compacting prevents the degradation of the magnetic characteristics due to processing strain introduced to the metal magnetic powder during the pressure compacting and relieves the processing strain. The heat treatment temperature is preferably a high temperature. However, when the temperature is increased too high, insulation between the powder particles becomes insufficient, and thus the eddy-current loss is increased, which is not preferable. The heat treatment temperature is preferably in the range of 700 to 1,000° C. If the temperature is lower than 700° C., it cannot be said that relieving of the strain is sufficient, and the magnetic characteristics are low, which is not preferable. If the temperature is higher than 1,000° C., it is difficult to sufficiently ensure insulation of the metal magnetic powder, and thus the eddy-current loss is increased, which is not preferable.

As the heat treatment atmosphere, in order to suppress the degradation of the magnetic characteristics due to oxidation of the metal magnetic powder, a non-oxidizing atmosphere, for example, an inert atmosphere such as argon gas, nitrogen gas, or helium gas, is preferable. As the purity of the inert gas, a purity of 4N to 5N may be used. In a gas having this purity, several ppm of oxygen is contained. However, significant oxidation does not occur in the metal magnetic powder, and thus deterioration of the magnetic characteristics is not caused. Moreover, a gas having a purity higher than 5N may also be used.

In addition, in this embodiment of the invention, as a pre-process of the heat treatment process, a heat treatment in an oxidizing atmosphere of the degreasing process may be performed. It is preferable that the temperature range of the degreasing process is from 200 to 400° C. If the temperature is lower than 200° C., thermal decomposition of the acrylic resin is insufficient, and if the temperature is higher than 400° C., the degradation of the magnetic characteristics are caused by the oxidation of the metal magnetic powder, which is not preferable. More preferably, the temperature range is from 200 to 350° C.

Hereinafter, Examples of the composite magnetic material of the invention will be described.

EXAMPLE 1

Metal magnetic powder having an average particle size of 24 μm and a composition including 9.1% of Si, 5.6% of Al, and the balance composed of Fe by weight % was prepared. To the prepared metal magnetic powder, 1.5 parts by weight of an acrylic resin shown in (Table 1) were added as a binding material, and a small amount of toluene was added, followed by mixing and dispersing, thereby producing a compound. The obtained compound was subjected to pressure compacting at 15 ton/$cm^2$, and a heat treatment in an argon gas atmosphere having a purity of 5N at 820° C. for 1 hour. In addition, the shape of the sample produced was a toroidal core having an outer diameter of 14 mm, an inside diameter of 10 mm, and a height of about 2 mm.

Evaluations of DC bias characteristics and core loss on the obtained samples were performed. For the DC bias characteristics, magnetic permeability was measured and evaluated at an applied magnetic field of 55 Oe and a frequency of 120 kHz using an LCR meter. The core loss was measured using an AC B-H curve analyzer at a measurement frequency of 120 kHz and a measurement magnetic flux density of 0.1 T. The obtained results are shown in (Table 1).

TABLE 1

| Sample No. | Silyl groups | Magnetic permeability | Core loss ($kW/m^3$) | |
|---|---|---|---|---|
| 1 | $Si(CH_3)_3$ | 47 | 405 | Example |
| 2 | $Si(C_2H_5)_3$ | 47 | 410 | Example |
| 3 | $Si(C_4H_9)_3$ | 43 | 500 | Example |
| 4 | $Si(C_6H_{13})_3$ | 41 | 580 | Example |
| 5 | $Si(OCH_3)_3$ | 58 | 250 | Example |
| 6 | $Si(OC_4H_9)_3$ | 56 | 290 | Example |
| 7 | $Si(CH_3)(OCH_3)_2$ | 56 | 260 | Example |
| 8 | $Si(OC_5H_{11})_3$ | 50 | 360 | Example |
| 9 | $Si(C_2H_5)_2(OC_2H_5)$ | 54 | 285 | Example |
| 10 | $Si(OC_3H_7)_3$ | 55 | 270 | Example |
| 11 | No | 35 | 2500 | Comparative Example |

From (Table 1), it can be seen that the composite magnetic material of this embodiment exhibits excellent DC bias characteristics and a low core loss.

In addition, when samples No. 1 to 4 are compared to samples No. 5 to 10, it can be seen that through having functional group that has at least one alkoxy group, increases in the density and insulating properties are further ensured, so that better DC bias characteristics and a low core loss are exhibited.

Moreover, when samples No. 5, 6, and 10 are compared to a sample No. 8, it can be seen that as the alkoxy group has the number of carbon atoms ranging from 1 to 4, increases in the density and insulating properties are even further ensured, so that even better DC bias characteristics and a low core loss are exhibited.

EXAMPLE 2

Metal magnetic powder having an average particle size of 15 μm and a composition including 49.1% of Ni and the balance composed of Fe by weight % was prepared. To 100 parts by weight of the prepared metal magnetic powder, an amount of acrylic resin having a triethoxysilyl group as a functional group shown in (Table 2) was added as a binding material, and then a small amount of toluene was added, followed by mixing and dispersing, thereby producing a compound. The obtained compound was subjected to pressure compacting at 9 ton/cm$^2$, and a heat treatment in a nitrogen gas atmosphere having a purity of 4N at 780° C. for 0.5 hour. In addition, the shape of the sample produced was a toroidal core having an outer diameter of 14 mm, an inside diameter of 10 mm, and a height of about 2 mm.

Evaluations of DC bias characteristics and core loss on the obtained samples were performed. For the DC bias characteristics, magnetic permeability was measured and evaluated at an applied magnetic field of 50 Oe and a frequency of 120 kHz by an LCR meter. The core loss was measured using an AC B-H curve analyzer at a measurement frequency of 110 kHz and a measurement magnetic flux density of 0.1 T. The obtained results are shown in (Table 2).

TABLE 2

| Sample No. | Addition amount (Parts by weight) | Magnetic permeability | Core loss (kW/m$^3$) | |
|---|---|---|---|---|
| 12 | 0.2 | 67 | 690 | Example |
| 13 | 1 | 71 | 595 | Example |
| 14 | 1.5 | 72 | 590 | Example |
| 15 | 2.5 | 69 | 605 | Example |
| 16 | 4 | 65 | 650 | Example |
| 17 | 5 | 60 | 680 | Example |
| 10 | 0.1 | 61 | 980 | Comparative Example |
| 11 | 7 | 52 | 720 | Comparative Example |

From (Table 2), it can be seen that excellent DC bias characteristics and a low core loss are exhibited when the amount of the binding material added is in the range of 0.2 to 5.0 parts by weight.

EXAMPLE 3

Metal magnetic powder having an average particle size of 20 μm and a composition including 5.1% of Si and the balance composed of Fe by weight % was prepared. To the prepared metal magnetic powder, 2.5 parts by weight of an acrylic resin having a trimethoxysilyl group as a functional group were added as a binding material, and a small amount of xylene was added, followed by mixing and dispersing, thereby producing a compound. The obtained compound was subjected to pressure compacting at 12 ton/cm$^2$ to be formed as a compact. The obtained compact was subjected to a heat treatment at 300° C. for 4 hours in the atmosphere to be degreased, and thereafter was subjected to a heat treatment at a temperature shown in (Table 3) in a helium gas atmosphere having a purity of 6N for 1 hour. In addition, the shape of the sample produced was a toroidal core having an outer diameter of 14 mm, an inside diameter of 10 mm, and a height of about 2 mm.

Evaluations of DC bias characteristics and core loss on the obtained samples were performed. For the DC bias characteristics, magnetic permeability was measured and evaluated at an applied magnetic field of 52 Oe and a frequency of 120 kHz by an LCR meter. The core loss was measured using an AC B-H curve analyzer at a measurement frequency of 110 kHz and a measurement magnetic flux density of 0.1 T. The obtained results are shown in (Table 3).

TABLE 3

| Sample No. | Heat treatment temperature (° C.) | Magnetic permeability | Core loss (kW/m$^3$) | |
|---|---|---|---|---|
| 20 | 700 | 68 | 1400 | Example |
| 21 | 800 | 70 | 1300 | Example |
| 22 | 850 | 75 | 1250 | Example |
| 23 | 900 | 71 | 1390 | Example |
| 24 | 1000 | 66 | 1460 | Example |
| 25 | 600 | 60 | 1710 | Comparative Example |
| 26 | 1100 | 57 | 3050 | Comparative Example |

From (Table 3), it can be seen that excellent DC bias characteristics and a low core loss are exhibited when the heat treatment temperature is in the range of 700 to 1,000° C.

INDUSTRIAL APPLICABILITY

The composite magnetic material of the invention has excellent DC bias characteristics and a low core loss and thus is useful particularly for a transformer core, a choke coil, a magnetic head, or the like.

The invention claimed is:

1. A composite magnetic material which is compacted by pressurizing metal magnetic powder to which a binding material is added, wherein the binding material contains an acrylic resin having a silyl group as a functional group.

2. The composite magnetic material of claim 1, wherein the silyl group has an alkoxy group.

3. The composite magnetic material of claim 2, wherein the number of carbon atoms of the alkoxy group is 1 to 4.

4. The composite magnetic material of claim 1, wherein the binding material is made by adding at least one selected from silane-based, titanium-based, chromium based, and aluminum-based coupling agents, silicone resin, epoxy resin, acrylic resin with no silyl group, butyral resin, and phenolic resin as an aid to the acrylic resin.

5. The composite magnetic material of claim 1, wherein the amount of the binding material added to the metal magnetic powder is 0.2 to 5.0 parts by weight with respect to 100 parts by weight of the metal magnetic powder.

6. The composite magnetic material of claim 1, wherein the metal magnetic powder is at least one selected from Fe, Fe—Si-based, Fe—Ni-based, and Fe—Si—Al-based powder.

7. The composite magnetic material of claim 1, wherein the average particle size of the metal magnetic powder is equal to or greater than 1 μm and equal to or smaller than 100 μm.

8. The composite magnetic material of claim 1, which is subjected to a heat treatment at a temperature between 700 and 1,000° C. in a non-oxidizing atmosphere.

* * * * *